United States Patent
Cronin et al.

(10) Patent No.: US 6,392,652 B1
(45) Date of Patent: May 21, 2002

(54) METHOD AND APPARATUS FOR DELIVERING ANIMATION OVER THE INTERNET

(75) Inventors: Thomas M. Cronin, Beaverton; Michael D. Rosenzweig, Hillsboro, both of OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/150,868

(22) Filed: Sep. 10, 1998

(51) Int. Cl.[7] .............................................. G06T 15/70
(52) U.S. Cl. ........................ 345/473; 345/474; 345/475
(58) Field of Search ................................ 345/473, 474, 345/475

(56) References Cited

U.S. PATENT DOCUMENTS

| | | | | |
|---|---|---|---|---|
| 5,519,825 A | * | 5/1996 | Naughton et al. | 395/152 |
| 5,628,012 A | * | 5/1997 | Libkin | 396/613 |
| 5,655,067 A | * | 8/1997 | Takahashi et al. | 395/173 |
| 5,706,417 A | * | 1/1998 | Adelson | 395/129 |
| 5,719,786 A | * | 2/1998 | Nelson et al. | 364/514 |
| 5,867,175 A | * | 2/1999 | Katzenberger et al. | 345/473 |

OTHER PUBLICATIONS

Article "Stochastic motion–motion under the influence of wind", by M. Sinya and A. Fournier, Japan Journal: Computer Graphics Forum vol. 11, No. 3, p. C119–28, C469, 1992.*

Ken Perlin, An Image Synthesizer. Computer Graphics, SIGGRAPH, Jul. 22–26, 1985. vol. 19, No. 3.

ZDNet: Web Animation Creation. Jan Ouzer and Luisa Simone, PC Magazine. WebPage [online]. Dec. 18, 1998 [retrieved on Jul.–31–2001] Retrieved from the Internet:<URL:http://zdnet.com/products/stories/reviews/0, 4161,333092,00.html.pp. 1–4.

Press Release–Intel Expands Web Developer Product Line Web Page [online]. Los Angeles, Mar. 11, 1998.[retrieved on Jul.–25–2000] Retrieved from the Internet:<URL:http://developer.intel.com/pressroom/archive/releases/IN31198B.HTM. pp. 1–3.

Press Release–Intel Unveils New Multimedia Software for Internet Web Pages [online]. Hillsboro, Oregon, Aug. 5, 1997. [retreieved on Jul.–25–2001] Retrieved from the Internet :<URL:http:///developer.intel.com/pressroom/archive/releases/IN080597.HTM.pp. 1–2.

Charles Mirho, Precedural Textures Bring Nature to Internet Explorer. Microsoft Interactive Developer, Jan. 1998. retrieved on Jun.–12–2001 Retrieved from the Internet:<URL:http://www.microsoft.com/mind/0198/proctext.htm. pp. 1–6.

* cited by examiner

Primary Examiner—Mark Zimmerman
Assistant Examiner—Enrique L Santiago
(74) Attorney, Agent, or Firm—Blakely, Sokoloff, Taylor & Zafman LLP

(57) ABSTRACT

A method for delivering animation includes transmitting a single source image to a client system. Parameters that generate a function are transmitted to the client system. Modulation frames are generated with the function. The modulation frames are applied to the single source image to generate the animation.

42 Claims, 6 Drawing Sheets

METHOD AND APPARATUS FOR DELIVERING ANIMATION OVER THE INTERNET

FIELD OF THE INVENTION

The present invention relates to the field of image processing. More specifically, the present invention relates to a method and apparatus for delivering animation over the Internet.

BACKGROUND OF THE INVENTION

The Internet and the World-Wide Web have become an expansive backbone of communication with a vast repository of information. The Internet and the World-Wide Web has also become a source of advertising for many companies. Web page advertising offers advantages over traditional forms of advertising. Web page advertising is attractive because it enables businesses to reach a large audience and create an impressive presence. Information presented on web pages can be more in-depth than that which can be presented over more traditional advertising media. In addition, the cost of web page advertisement may be less than the cost of other forms of advertisement.

Web pages may include information formatted in simple text, audio, graphics, and video. Web pages are often decorated with various multimedia presentations to make it more attractive to viewers. Among the various multimedia presentation forms used by web page designers, animation has become popular. Animation has typically been implemented by web page designers with animated graphics interchange format (GIFs) or Java applets. Animated GIFs are a type of GIF image that can be animated by combining several images into a single GIF file. Java applets are programs designed to be executed from within another application that may include animated effects.

Delivering animation over the Internet using animated GIFs and Java applets has several drawbacks. In order to access GIF files or Java applets, considerable download time may be required by a web browse to download the plurality of images in the GIF file or the lines of code in the Java applet. In addition, animated GIFs provide only a defined number of pre-generated animated cells that must be repeated over and over.

SUMMARY OF THE INVENTION

A method for delivering animation is disclosed. A single source image is transmitted to the client system. Parameters that generate a function are transmitted to the client system. Modulation frames are generated with the function. The modulation frames are applied to the single source image to generate the animation.

BRIEF DESCRIPTION OF THE DRAWINGS

The present invention is illustrated by way of example and not by way of limitation in the figures of the accompanying drawings, in which the like references indicate similar elements in and in which.

DETAILED DESCRIPTION

Figure 1:
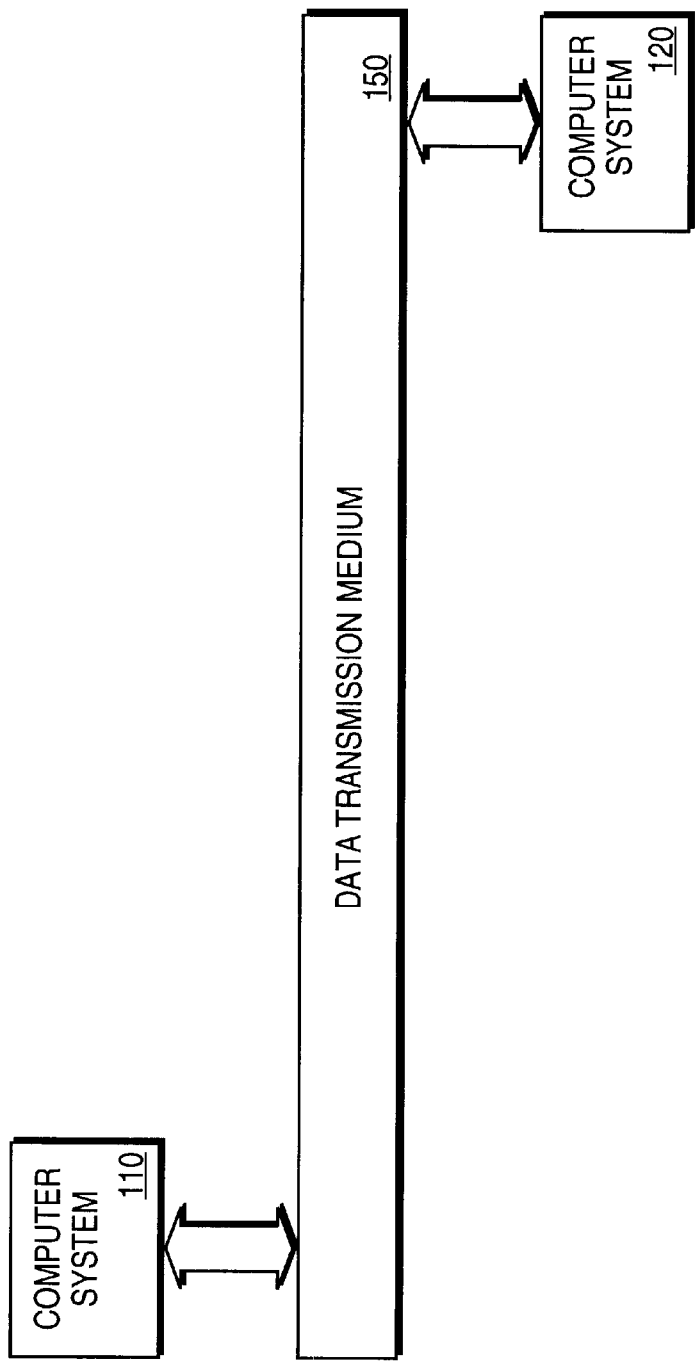
FIG. 1 is a block diagram of a network of computer systems implementing an embodiment of the present invention.

FIG. 1 is a block diagram of a network 100 implementing an embodiment of the present invention. The network includes a first computer system 110 at a first location and a second computer system 120 at a second location. The first computer system 110 and the second computer system 120 are coupled to a transmission medium 150. The first computer system 110 and the second computer system 120 transmit data to each other via the data transmission medium 150. The transmission medium 150 may be one or a combination of fiber optics, cable, twisted pair, microwave, or other media. The transmission medium 150 may be implemented to support an internal network connection, an Internet connection, or other connections. The first computer system 110 may interface with the second computer system 120 via the transmission medium 150 to obtain files.

According to an embodiment of the present invention, the second computer system 120 is a HyperText Transfer Protocol (HTTP) server that stores Hyper Text Markup Language (HTML) files. The second computer system 120 has an Internet domain name and includes HTML files that have an Uniform Resource Locator (URL). An URL includes the file's name, preceded by a hierarchy of directory names in which the file is stored, the Internet domain name of the second computer system 120, and the software and manner by which a web browser (not shown) on the first computer system 110 and the second computer system 120 communicate to exchange the file.

The file transmitted to the first computer system 110 from the second computer system 120 includes animation data that may be used by the first computer system 110 to create and display animation. The animation is created by generating a plurality of animation frames. An animation frame is generated by generating a function using parameters in the animation data, generating a modulation frame with the function, and applying the modulation frame to a single source image in the animation data. A function may be generated from the parameters that may generate an infinite number of unique modulation frames. The bandwidth required for transmitting the animation data is low since the animation data need only include parameters for generating the function and a single source image.

Figure 2:
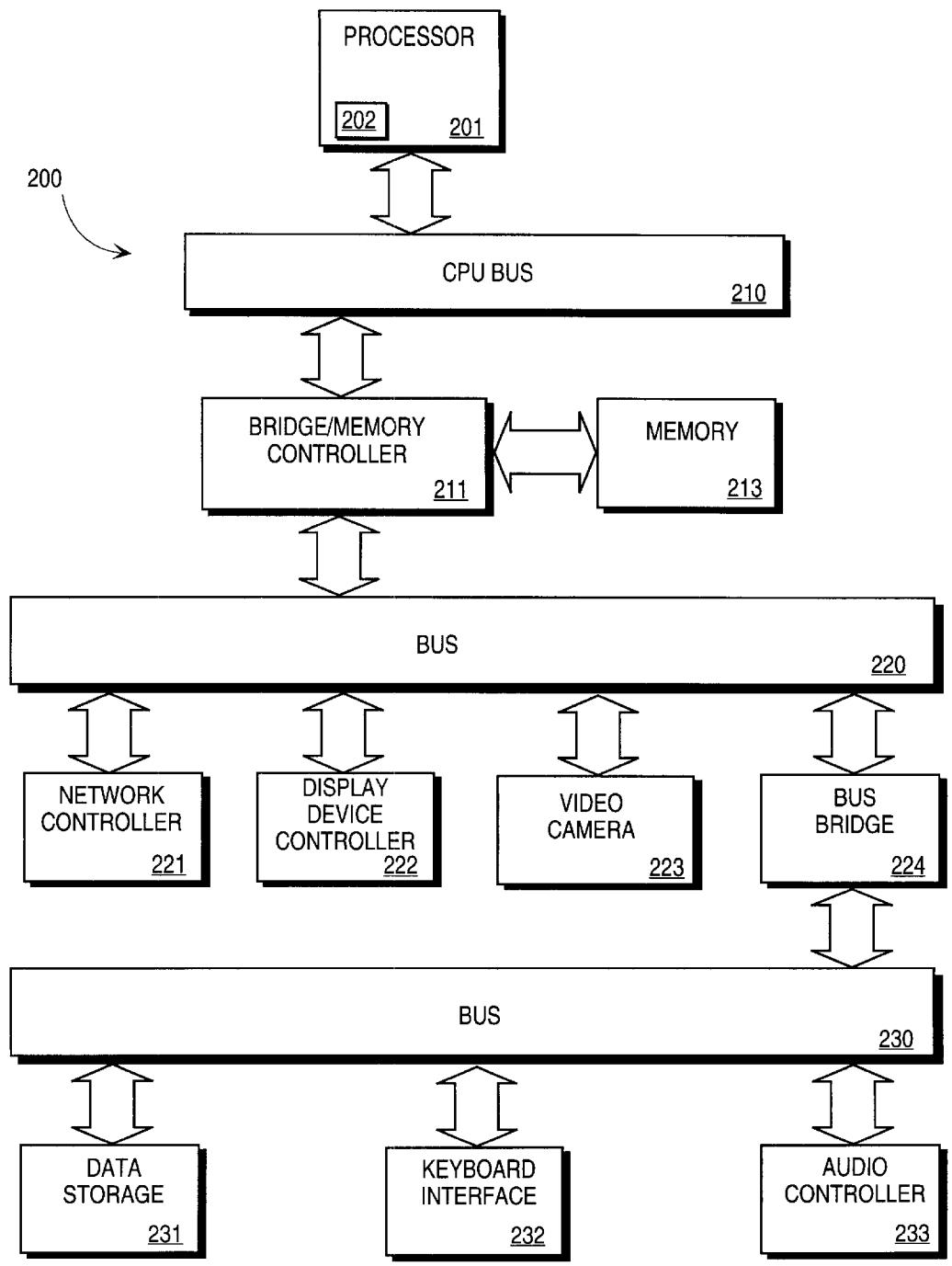
FIG. 2 is a block diagram of a computer system implementing an embodiment of the present invention.

FIG. 2 is a block diagram of a computer system 200 upon which an embodiment of the present invention can be implemented. The computer system 200 may be implemented as the first computer system 110 or the second computer system 120 shown in FIG. 1. The computer system 200 includes a processor 201 that processes data signals. The processor 201 may be a complex instruction set computer (CISC) microprocessor, a reduced instruction set computing (RISC) microprocessor, a very long instruction word (VLIW) microprocessor, a processor implementing a combination of instruction sets, or other processor device. FIG. 2 shows an example of the present invention implemented on a single processor computer system 200. However, it is understood that the present invention may be implemented in a computer system having multiple processors. The processor 201 is coupled to a CPU bus 210 that transmits data signals between processor 201 and other components in the computer system 200.

The computer system 200 includes a memory 213. The memory 213 may be a dynamic random access memory (DRAM) device, a static random access memory (SRAM) device, or other memory device. The memory 213 may store instructions and code represented by data signals that may be executed by the processor 201. A cache memory 202 resides inside processor 201 that stores data signals stored in memory 213. The cache 202 speeds up memory accesses by the processor 201 by taking advantage of its locality of access. In an alternate embodiment of the computer system 200, the cache 202 resides external to the processor 201.

A bridge memory controller 211 is coupled to the CPU bus 210 and the memory 213. The bridge memory controller 211 directs data signals between the processor 201, the memory 213, and other components in the computer system 200 and bridges the data signals between the CPU bus 210, the memory 213, and a first I/O bus 220.

The first I/O bus 220 may be a single bus or a combination of multiple buses. As an example, the first I/O bus 220 may comprise a Peripheral Component Interconnect (PCI) bus, a Personal Computer Memory Card International Association (PCMCIA) bus, a NuBus, or other buses. The first I/O bus 220 provides communication links between components in the computer system 200. A network controller 221 is coupled to the first I/O bus 220. The network controller 221 links the computer system 200 to a network of computers (not shown in FIG. 2) and supports communication among the machines. A display device controller 222 is coupled to the first I/O bus 220. The display device controller 222 allows coupling of a display device to the computer system 200 and acts as an interface between the display device and the computer system 200. The display device controller may be a monochrome display adapter (MDA) card, a color graphics adapter (CGA) card, an enhanced graphics adapter (EGA) card, an extended graphics array (XGA) card or other display device controller. The display device may be a television set, a computer monitor, a flat panel display or other display device. The display device receives data signals from the processor 201 through the display device controller 222 and displays the information and data signals to the user of the computer system 200. A video camera 223 is coupled to the first I/O bus 220. The video camera 223 operates to capture an image of an object. The video camera 223 may be a digital video camera having internal digital video capture hardware that translates the captured image into digital graphical data. The video camera 223 may be an analog video camera having digital video capture hardware external to the video camera 223 for digitizing the captured image.

A second I/O bus 230 may be a single bus or a combination of multiple buses. As an example, the second I/O bus 230 may comprise a PCI bus, a PCMCIA bus, a NuBus, an Industry Standard Architecture (ISA) bus, or other buses. The second I/O bus 230 provides communication links between components in the computer system 200. A data storage device 231 is coupled to the second I/O bus 230. The data storage device 231 may be a hard disk drive, a floppy disk drive, a CD-ROM device, a flash memory device or other mass storage device. A keyboard interface 232 is coupled to the second I/O bus 230. The keyboard interface 232 may be a keyboard controller or other keyboard interface. The keyboard interface 232 may be a dedicated device or can reside in another device such as a bus controller or other controller. The keyboard interface 232 allows coupling of a keyboard to the computer system 200 and transmits data signals from a keyboard to the computer system 200. An audio controller 233 is coupled to the second I/O bus 230. The audio controller 233 operates to coordinate the recording and playing of sounds.

A bus bridge 224 couples the first I/O bus 220 to the second I/O bus 230. The bus bridge 224 operates to buffer and bridge data signals between the first I/O bus 220 and the second I/O bus 230.

The present invention is related to the use of the computer system 200 to generate animation. According to one embodiment, generating animation is performed by the computer system 200 in response to the processor 201 executing a sequence of instructions in main memory 213. Such instructions may be read into memory 213 from another computer-readable medium, such as data storage device 231, or from another source via the network controller 221. Execution of the sequence of instructions causes the processor 201 to generate animation, as will be described hereafter. In an alternative embodiment, hardware circuitry may be used in place of or in combination with software instructions to implement the present invention. Thus, the present invention is not limited to any specific combination of hardware circuitry and software.

Figure 3:
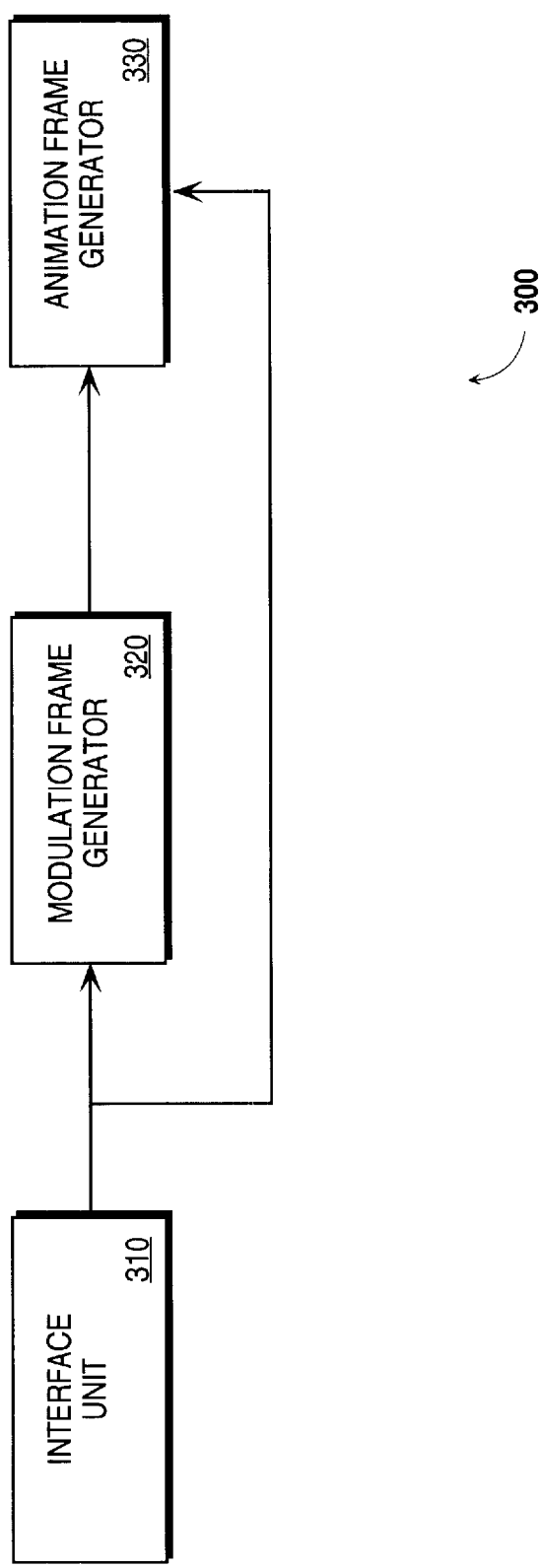
FIG. 3 is a block diagram of an animation effect unit according to an embodiment of the present invention.

FIG. 3 is a block diagram illustrating modules implementing an animation effect unit 300 that generates animation according to an embodiment of the present invention. In a preferred embodiment of the present invention, the modules are implemented in software and reside in main memory 213 (shown in FIG. 2) of the first computer system 110 (shown in FIG. 1) as sequences of instructions. It should be appreciated that the modules may be implemented by hardware as components coupled to the bus 220 (shown in FIG. 2) or a combination of both hardware and software. The animation effect unit 300 includes an interface unit 310. The interface unit 310 interfaces with a web browser in the first computer system 110 (shown in FIG. 1). The interface unit 310 receives animation data and instructions to generate an animation frame from the web browser. The animation data may include parameters for generating a function. The animation data may also include a single source image that may be used as a seed image to generate an animation frame.

A modulation frame generator 320 is coupled to the interface unit 310. The modulation frame generator 320 receives the parameters from the interface unit 310. Upon receiving instructions to generate an animation frame, the modulation frame generator 320 generates a function with the parameters and uses the function to generate modulation frames. According to an embodiment of the present invention, the modulation frame generator 320 generates a turbulence function with harmonics data from the parameters. The modulation frame generator 320 generates a plurality of noise frames with the turbulence function and sums the noise frames to form a turbulence frame. The turbulence frame is used as a modulation frame by the animation effect unit 300 where the coefficients in the turbulence frame determines a degree to change a color value in the source image. According to an alternate embodiment of the present invention, the modulation frame generator 320 generates a periodic, non-repeating function with frequency and amplitude data from the parameters. The modulation frame generator 320 generates a modulation frame using the output of the periodic, non-repeating function to determine a degree to shift pixels in the source image. It should be appreciated that parameters that generate other functions may be used to generate modulation frames.

An animation frame generator 330 is coupled to the interface unit 310 and the modulation frame generator 320.

The animation frame generator 330 receives the source image from the interface unit 310 and the modulation frame from the modulation frame generator 320. Upon receiving instructions to generate an animation frame, the animation frame generator 330 applies the modulation frame to the source image to generate an animation frame.

The interface unit 310, modulation frame generator 320, and the animation frame generator 330 may be implemented using any known circuitry or technique. In an embodiment of the present invention where the animation effect unit 300 is implemented in hardware, the interface unit 310, the modulation frame generator 320, and the animation frame generator 330 all reside on a single semiconductor substrate.

The present invention reduces the bandwidth required for delivering animation from the second computer system 120 (shown in FIG. 1) to the first computer system 110 (shown in FIG. 1) by transmitting only animation data used to generate the animation on to the first computer system 110. The animation data may include parameters for generating a function and a source image. Transmitting animation data over the data transmission medium 150 requires less bandwidth than transmitting an animated GIF file or a Java applet. Animation frames are generated on the fly, in real-time, at the first computer system 110 using the animation data. The animation frames are generated at the first computer system 110 by perturbing the source image with the function.

Figure 4:
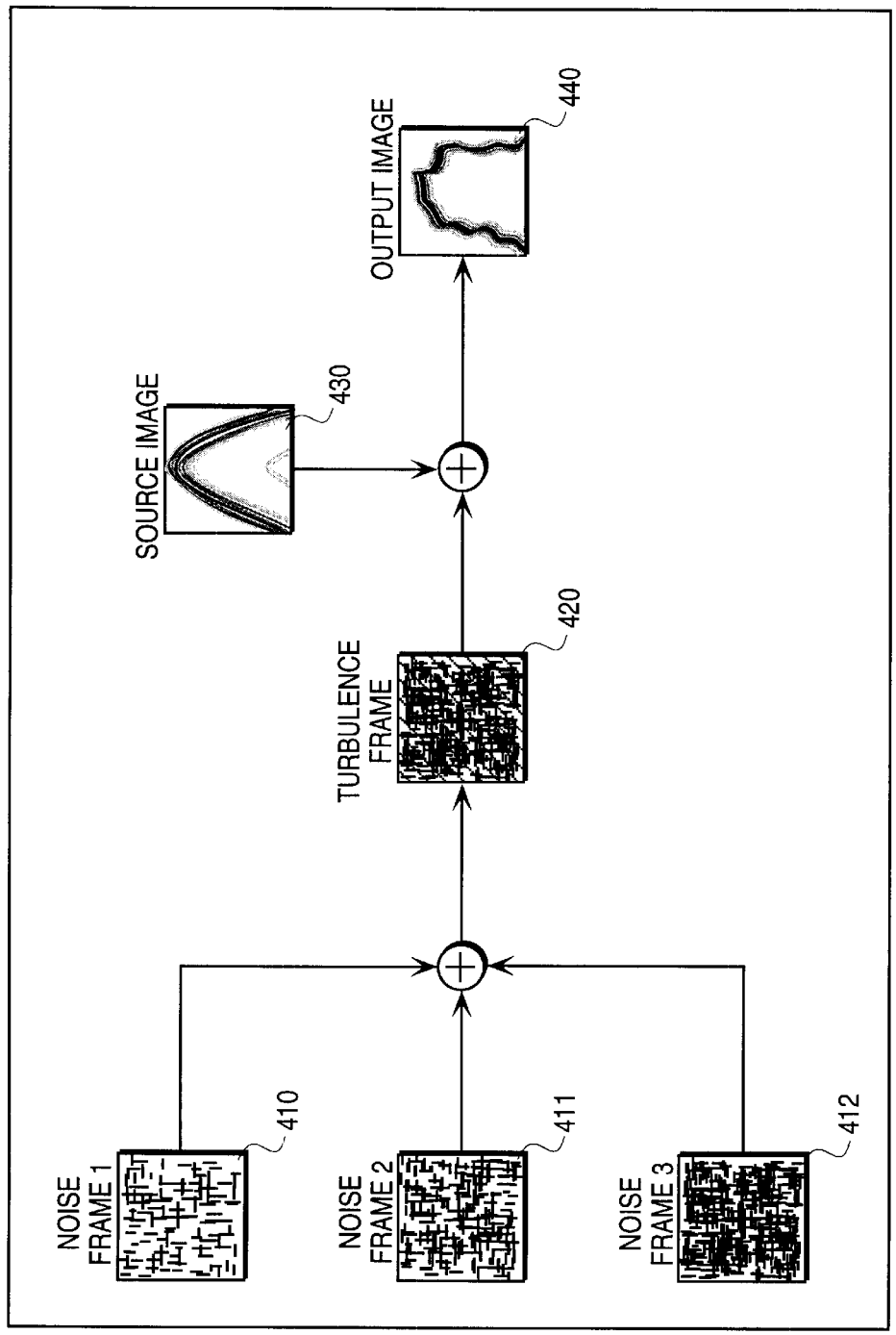
FIG. 4 illustrates how an animation frame is generated according to an embodiment of the present invention.

FIG. 4 illustrates how an animation frame is generated according to an embodiment of the present invention where a turbulence function is used to generate modulation frames. Noise frame 1 410, noise frame 2 411, and noise frame 3 412 are generated by the modulation frame generator 320 (shown in FIG. 3) and are summed together to form turbulence frame 420. The turbulence frame 420 is applied to the source image 430 by the animation frame generator 330 (shown in FIG. 3) to form an output image 440 used as an animation frame.

Figure 5:
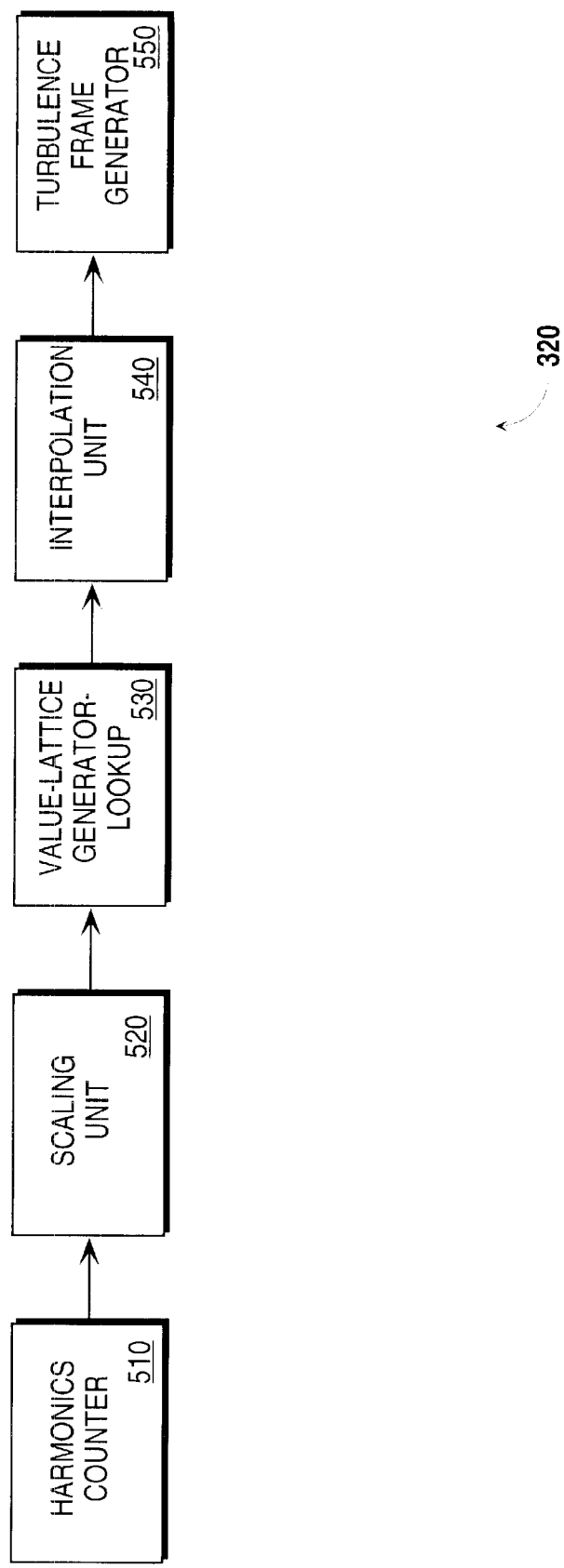
FIG. 5 illustrates a modulation frame generator according to an embodiment of the present invention.

FIG. 5 illustrates a modulation frame generator 320 according to an embodiment of the present invention. The modulation frame generator 320 includes a harmonics counter 510. The harmonics counter 510 receives harmonics data from the interface unit 310. The harmonics data includes a number of sets of harmonics to be generated and pixel coordinate scaling values. For each desired harmonic, the harmonics counter 510 generates a set of scaling values. Each set of harmonics may be used to generate a noise frame.

A scaling unit 520 is coupled to the harmonics counter 510. The scaling unit 520 receives the set of scaling values from the harmonics counter 510 (shown in FIG. 3). For every pixel coordinate on a noise frame that the modulation frame generator 320 generates, the scaling unit 520 scales the pixel coordinates according to the set of scaling values.

A value-lattice noise generator-lookup 530 is coupled to the scaling unit 520. The value-lattice noise generator 530 receives the scaled pixel coordinates from the scaling unit 520 and generates vertices for the value-lattice noise using the scaled pixel coordinates. The vertices for the value-lattice noise is generated once per animation. The value-lattice noise generator-lookup 530 selects noise values from the generated value-lattice noise to pass to an interpolation unit 530. It should be appreciated that a value-lattice noise may be generated each time a single interpolation noise value is to be produced, wherein the value-lattice noise generated is identical for a given set of scaled pixel coordinates. Alternatively, instead of selecting noise values from the generated value-lattice noise, previously selected noise values may be reused.

The interpolation unit 530 is coupled to the value-lattice noise generator unit 530. The interpolation unit 530 receives the selected noise values from the generated value-lattice noise. The interpolation unit 530 interpolates between the various input noise values to produce a single interpolated noise value.

A turbulence frame generator 540 is coupled to the interpolation unit 530. The turbulence frame generator 540 receives the noise values produced by the interpolation unit 530 and adds it to the value in the location of the current unscaled pixel coordinates. After the turbulence frame generator 540 is finished with the interpolated noise value, it returns control to the harmonics counter 510 if there are more harmonics to process for the current pixel location or if there are no new pixel locations to calculate. If the current turbulence frame is complete, control is handed to the animation frame generator 330 (shown in FIG. 3).

It should be appreciated that the harmonics counter 510, scaling unit 520, value-lattice generator 530, interpolation unit 540, and the turbulence frame generator 550 may be connected together in a manner different than the one shown in FIG. 5. The harmonics counter 510, scaling unit 520, value-lattice generator 530, interpolation unit 540, and the turbulence frame generator 550 may be implemented using any known circuitry or technique. In an embodiment of the present invention where the modulation frame generator 320 is implemented in hardware, the harmonics counter 510, scaling unit 520, value-lattice generator 530, interpolation unit 540, and the turbulence frame generator 550 all reside on a same semiconductor substrate.

Figure 6:
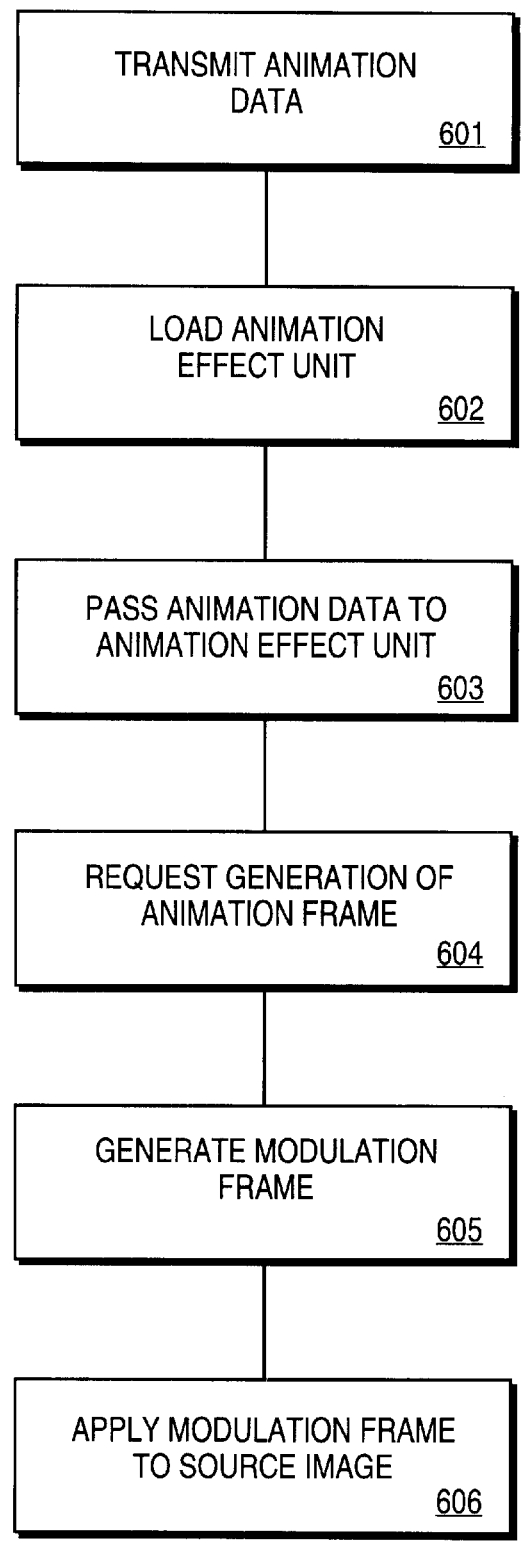
FIG. 6 is a flow chart illustrating a method for delivering animation according to an embodiment of the present invention.

FIG. 6 is a flow chart illustrating a method for delivering animation according to an embodiment of the present invention. At step 601, animation data is transmitted from a second computer system to a first computer system. The animation data may be transmitted over the Internet, an internal network connection, or other connections.

At step 602, an animation effect unit is loaded into memory. According to an embodiment of the present invention, the animation effect unit may be a plug-in that resides in a data storage unit of the first computer system. Alternatively, the animation effect unit may be implemented in hardware and would not require loading.

At step 603, the animation data is passed to the animation effect unit. According to an embodiment of the present invention, the animation data includes a single source image and parameters for generating a function. It should be appreciated that the animation data may also include additional data that determines how the modulation frames are applied to the source image and/or a mask image. It should also be appreciated that instead of including actual parameters and a source image, the animation data may include an address of a location where the parameters and/or source image may be downloaded. It should also be appreciated that in situations where an animation does not require a source image a source image may not be included in the animation data.

At step 604, a request to generate a frame of animation is transmitted to the animation effect unit. According to an embodiment of the present invention, the request is generated from a web browser on the first computer system that is executing a file calling for the animation.

At step 605, a modulation frame is generated with the function. According to an embodiment of the present invention, generating a modulation frame is achieved by generating a plurality of noise frames with the function and summing the noise frames to form a turbulence frame. According to an alternate embodiment of the present invention, generating a modulation frame is achieved by plotting degrees of shifting with outputs of the function.

At step 606, the animation effect unit applies the modulation frame to the source image to generate an animation frame. In situations where the animation does not require a source image the modulation frame is defined as the animation frame.

In the foregoing description, the invention is described with reference to specific exemplary embodiments thereof. It will, however, be evident that various modifications and changes may be made thereto without departing from the broader spirit and scope of the present invention as set forth in the appended claims. The specification and drawings are accordingly to be regarded in an illustrative rather than a restrictive sense.

What is claimed is:

1. A method for delivering animation, comprising:
    transmitting a source image from a second computer system to a first computer system via a transmission medium;
    transmitting parameters from a second computer system to a first computer system via a transmission medium, wherein the parameters are operable to cause a modulation frame generating function to be generated on the first computer system using the transmitted parameters, wherein the modulation frame generating function is operable to generate a plurality of modulation frames, wherein the plurality of modulation frames are operable for application to the source image to generate a plurality of animation frames.

2. The method of claim 1, wherein transmitting parameters comprises transmitting parameters that are operable to generate a plurality of noise frames, wherein the plurality of noise frames are operable to generate a plurality of turbulence frames.

3. The method of claim 1, wherein transmitting parameters comprises transmitting parameters that are operable to evaluate a modulation frame generating function that is not transmitted and is stored in a memory of a first computer system and associated with a web browser stored in the memory of the first computer system.

4. The method of claim 1, wherein transmitting the parameters comprises transmitting harmonics data that define a turbulence function.

5. The method of claim 1, wherein transmitting parameters includes transmitting parameters that are operable to generate an arbitrary number of unique modulation frames.

6. The method of claim 1, wherein generating modulation frames with the modulation frame generating function and applying the modulation frames to the image to generate the animation is performed in real-time.

7. The method of claim 1, wherein transmitting parameters comprises transmitting frequency and amplitude data that is operable to generate a periodic non-repeating modulation frame generating function on a computer system.

8. The method of claim 1, wherein the transmitted parameters are not associated with regenerating a compressed sequence of images.

9. The method of claim 1, wherein transmitting parameters to the first computer system comprises transmitting parameters that generate non-deterministic modulation frame generating functions operable to generate a plurality of unique modulation frames, wherein characteristics of each of the plurality of unique modulation frames are not predetermined.

10. A method for generating animation, comprising:
    receiving a source image from a remote computer system;
    receiving parameters from the remote computer system that are not associated with regenerating a compressed sequence of images;
    generating a modulation frame generating function with the parameters;
    generating a plurality of modulation frames with the modulation frame generating function; and
    applying the plurality of modulation frames to the source image to generate the animation.

11. The method of claim 10, wherein generating the plurality of modulation frames with the modulation frame generating function comprises:
    generating a plurality of noise frames; and
    generating a plurality of turbulence frames with the plurality of noise frames.

12. The method of claim 10, wherein generating the plurality of modulation frames with the modulation frame generating function comprises plotting degrees of shifting with outputs of the modulation frame generating function.

13. The method of claim 10, wherein receiving the parameters from the remote computer system comprises receiving harmonics data that define a turbulence function.

14. The method of claim 10, wherein generating the plurality of modulation frames with the modulation frame generating function includes generating an arbitrary number of unique modulation frames.

15. The method of claim 10, wherein generating the modulation frames with the modulation frame generating function and applying the modulation frames to the source image to generate the animation is performed in real-time.

16. The method of claim 10, wherein generating the modulation frame generating function with the parameters comprises using the parameters to evaluate a modulation frame generating function that was not received from the remote computer system and that is stored in a memory of a computer system and associated with a web browser stored in the memory of the computer system.

17. The method of claim 10:
    wherein receiving the parameters from the remote computer comprises receiving frequency and amplitude data; and
    wherein generating the modulation frame generating function comprises generating a periodic non-repeating modulation frame generating function with the frequency and amplitude data.

18. The method of claim 10:
    wherein receiving the parameters from the remote computer comprises receiving parameters that generate a non-deterministic modulation frame generating function;
    wherein generating the modulation frame generating function with the parameters comprises generating the non-deterministic modulation frame generating function; and
    wherein generating the modulation frames comprises generating a plurality of unique modulation each having characteristics that are not predetermined.

19. A computer-readable medium having a sequence of instructions stored thereon that when executed cause a computer to perform operations comprising:
    receiving a source image from a remote computer system;
    receiving parameters from the remote computer system;
    generating a modulation frame generating function with the parameters including using the parameters to evaluate the modulation frame generating function, wherein the modulation frame generating function is stored in a memory of a computer system and was not received from the remote computer system, and wherein the modulation frame generating function is associated with a web browser in the memory of the computer system;

generating a plurality of modulation frames with the modulation frame generating function; and applying the plurality of modulation frames to the source image to generate an animation.

20. The computer-readable medium of claim 19, wherein the instructions for generating the plurality of modulation frames with the modulation frame generating function further include instructions causing the computer to perform operations comprising:

generating a plurality of noise frames; and generating a plurality of turbulence frames with the plurality of noise frames.

21. The computer-readable medium of claim 19, wherein the instructions for generating the plurality of modulation frames with the modulation frame generating function further include instructions causing the computer to perform operations comprising plotting degrees of shifting with outputs of the modulation frame generating function.

22. The computer-readable medium of claim 19:

wherein the instructions that cause the computer to receive the parameters from the remote computer further include instructions causing the computer to perform operations comprising receiving frequency and amplitude data; and wherein the instructions that cause the computer to generate the modulation frame generating function further include instructions causing the computer to perform operations comprising generating a periodic non-repeating modulation frame generating function with the frequency and amplitude data.

23. The computer-readable medium of claim 19, wherein the instructions that cause the computer to receive the parameters are instructions that cause the computer to perform operations comprising receiving parameters that are not associated with regenerating a compressed sequence of images.

24. The computer-readable medium of claim 19:

wherein the instructions that cause the computer to receive the parameters from the remote computer further include instructions causing the computer to perform operations comprising receiving parameters that generate a non-deterministic modulation frame generating function;

wherein the instructions that cause the computer to generate the modulation frame generating function with the parameters further include instructions causing the computer to perform operations comprising generating the non-deterministic modulation frame generating function; and wherein the instructions that cause the computer to generate the modulation frames further include instructions causing the computer to perform operations comprising generating a plurality of unique modulation frames each having characteristics that are not predetermined.

25. An animation effect unit, comprising:

an interface unit to receive a source image and parameters;

a modulation frame generator coupled with the interface unit to receive the parameters from the interface unit and to generate and evaluate a modulation frame generating function with the parameters to generate a plurality of modulation frames with the modulation frame generating function, wherein the modulation frame generating function was not received by the interface unit and is stored in a memory of a computer system that includes the animation effect unit, and wherein the modulation frame generating function is associated with a web browser that is also stored in the memory of the computer system; and an animation frame generator coupled with the modulation frame generator and the interface unit to generate animation frames by applying the plurality of modulation frames to the source image.

26. The animation effect unit of claim 25, wherein the modulation frame generator is a modulation frame generator to:

generate a plurality of noise frames by using the modulation frame generating function; and generate a plurality of turbulence modulation frames with the plurality of noise frames.

27. The method of claim 25, wherein the parameters received from the interface unit are not associated with regenerating a compressed sequence of images.

28. The animation effect unit of claim 25, further comprising:

a bus coupled with the animation effect unit; and a processor coupled with the bus to receive animation effect data for processing via the bus; and a display device to display processed animation effect data.

29. A method for generating animation, comprising:

providing a web browser at a first computer system to access a second computer system via a data transmission medium;

providing at least one animation function in a memory associated with the first computer system to operate with the web browser;

receiving animation data from the second computer system via the web browser, the animation data being insufficient to provide animation without the at least one animation function; and combining the animation data with the at least one animation function and using the resulting combination to modify a source image and to generate animation.

30. The method of claim 29, wherein the memory associated with the first computer system includes one or more source images to operate with the web browser, wherein one or more of the one or more source images may be used to generate animation.

31. The method of claim 29, wherein the animation data includes scaling data for specifying regions affected by the animation.

32. The method of claim 29, wherein the at least one animation function is received from the second computer system via the web browser.

33. The method of claim 29, wherein combining includes receiving a request to generate animation from a web browser executing a file.

34. The method of claim 29, wherein receiving animation data includes receiving harmonics data that define a turbulence function.

35. The method of claim 29, wherein receiving animation data includes receiving parameters that are not associated with regenerating a compressed sequence of images.

36. The method of claim 29:

wherein receiving animation data includes receiving frequency and amplitude data; and wherein combining includes combining the frequency and amplitude data with a periodic non-repeating modulation frame generating function and using the function to generate frames that modify the source image.

37. The method of claim 29, wherein combining comprises:

generating a plurality of noise frames; and generating a plurality of turbulence frames with the plurality of noise frames.

38. The method of claim 29, wherein combining includes combining the animation data with an animation function that determines a degree to shift one or more pixels.

39. The method of claim 29, wherein combining includes combining the animation data with the at least one animation function and using the resulting combination to generate an arbitrary number of unique modulation frames.

40. The method of claim 29, wherein combining the animation data with the at least one animation function and using the resulting combination to modify a source image and generate animation is performed in real time.

41. The method of claim 29:

wherein receiving animation data includes receiving parameters that generate a non-deterministic modulation frame generating function;

wherein combining the animation data with the at least one animation function includes combining the parameters with the non-deterministic modulation frame generating function and using the resulting combination to generate a plurality of unique modulation frames that each have characteristics that are not predetermined.

42. The method of claim 29, wherein combining includes combining the received animation data with the at least one animation function to generate frames that perturb a single source image to generate animation.

* * * * *